US006881106B1

(12) United States Patent
Gonring

(10) Patent No.: US 6,881,106 B1
(45) Date of Patent: Apr. 19, 2005

(54) POWER FAULT DETECTION SYSTEM FOR A COMMUNICATION BUS

(75) Inventor: Steven J. Gonring, Slinger, WI (US)

(73) Assignee: Brunswick Corporation, Lake Forest, IL (US)

( * ) Notice: Subject to any disclaimer, the term of this patent is extended or adjusted under 35 U.S.C. 154(b) by 3 days.

(21) Appl. No.: 10/694,324

(22) Filed: Oct. 27, 2003

(51) Int. Cl.[7] ............................................. B63H 21/22
(52) U.S. Cl. ......................................................... 440/1
(58) Field of Search ................................. 440/1, 2, 84

(56) References Cited

U.S. PATENT DOCUMENTS

| | | | | |
|---|---|---|---|---|
| 4,320,452 A | * | 3/1982 | Kempf et al. | 710/107 |
| 4,406,007 A | * | 9/1983 | Kister et al. | 370/217 |
| 4,616,302 A | * | 10/1986 | Mandelcorn | 363/50 |
| 5,469,150 A | | 11/1995 | Sitte | 340/825.07 |
| 6,273,771 B1 | | 8/2001 | Buckley et al. | 440/84 |
| 6,382,122 B1 | | 5/2002 | Gaynor et al. | 114/144 |
| 6,535,028 B1 | * | 3/2003 | Baker | 327/63 |
| 6,564,739 B1 | | 5/2003 | Doetsch | 114/150 |
| 6,587,765 B1 | | 7/2003 | Graham et al. | 701/21 |
| 6,683,912 B1 | * | 1/2004 | Kole | 375/257 |

* cited by examiner

*Primary Examiner*—Stephen Avila
(74) *Attorney, Agent, or Firm*—William D. Lanyi

(57) ABSTRACT

A method is provided for monitoring voltage changes along a cable. First and second controllers monitor voltage potentials at first and second locations along the cable and these voltage potentials are compared to determine whether or not voltage drops exist along the cable. These voltage drops would normally be caused by improperly connected or damaged nodes which increase the resistance to the power provided by a power source.

20 Claims, 2 Drawing Sheets

POWER FAULT DETECTION SYSTEM FOR A COMMUNICATION BUS

BACKGROUND OF THE INVENTION

1. Field of the Invention

The present invention relates generally to a power fault detection system and, more particularly, to a detection system for use in conjunction with a communication bus for a marine vessel.

2. Description of the Prior Art

Many types of communication systems are known for use in conjunction with a marine vessel, in which a plurality of devices are connected to a communication bus, such as a CAN bus which is well known to those skilled in the art. Although many different types of communication buses are used in vehicle communication systems, one particularly well known system was developed and provided by Robert Bosch GmbH and that system is known as a CAN bus. It is a Controller Area Network (CAN) bus and details of the CAN protocol have been described in detail in a 1991 revision of a CAN specification, versions 1.2 and 2.0, which are very well known to those skilled in the art and will not be described in detail herein.

U.S. Pat. No. 6,273,771, which issued to Buckley et al. on Aug. 14, 2001, discloses a control system for a marine vessel. The control system incorporates a marine propulsion system that can be attached to a marine vessel and connected in signal communication with a serial communication bus and a controller. A plurality of input devices and output devices are also connected in signal communication with a communication bus and a bus axis manager, such as a CAN Kingdom network, is connected in a signal communication with the controller to regulate the incorporation of additional devices to the plurality of devices in signal communication with the bus, whereby the controller is connected in signal communication with each of the plurality of devices on the communication bus. The input and output devices can each transmit messages to the serial communication bus for a receipt by other devices.

U.S. Pat. No. 6,382,122, which issued to Gaynor et al. on May 7, 2002, discloses a method for initializing a marine vessel control system. An auto detect system is provided for a marine vessel in which the various associations and relationships between marine vessel devices, gauges, sensors, and other components are quickly and easily determined. The system performs a method which automatically determines the number of marine propulsion devices on the marine vessel and, where needed, prompts the boat builder or marine vessel outfitter to enter various commands to identify particular marine propulsion devices with references to their location on the marine vessel and to identify certain other components, such as gauges, with reference to both their location at a particular helm station and their association with a particular marine propulsion device.

U.S. Pat. No. 5,469,150, which issued to Sitte on Nov. 21, 1995, describes a sensor actuator bus system. A four-wire bus is provided with a two-wire power bus and a two-wire signal bus and a plurality of sensors and actuators attached to both two-wire buses. A modification is provided to the standard CAN protocol developed and provided by Robert Bosch GmbH, in which the standard CAN header, of a data packet is modified to incorporate a shortened device identifier priority. By shortening the identifier field of the CAN header three bits are made available for use as a short form protocol data unit which can be used to contain binary information representing both the change of status of an identified device and the current status of the device. The same three-bit PDU can be used to acknowledge receipt of the change of status information. In order to retain all of the beneficial capabilities of the standard CAN protocol, the three-bit short form PDU can also be used to identify the use of additional bytes of a data field so that a device can take advantage of the more complex capabilities of the standard CAN protocol. However, in situations where a mere change of status report is sufficient, the present invention reduces the length of a message from a minimum of three bytes to a length of two bytes to obtain the significant benefits of increased speed of message transmission.

U.S. Pat. No. 6,564,739, which issued to Doetsch on May 20, 2003, describes a marine steering system having dual hydraulic and electronic output. The system is operable in either power steering or manual hydraulic modes. The system employs a modified helm pump having a single rotatable input shaft connectable to a steering wheel and dual hydraulic and electronic outputs. An encoder, such as an optical incremental encoder or hall effect device, is mechanically coupled to the input shaft for generating an electronic steering control signal representative of the change in position of the steering wheel. In power steering mode, the electronic steering signal is processed by an amplifier controlling the operation of an auxiliary pump set connected to the rudder steering cylinder. A bypass manifold is disposed between the helm pump and steering cylinder and disables the hydraulic steering system in the power steering mode. In the event of power failure, the bypass manifold valves are open and the system automatically switches to manual hydraulic steering.

U.S. Pat. No. 6,587,765, which issued to Graham et al. on Jul. 1, 2003, describes an electronic control system for marine vessels. The system has one or more engines and a transmission associated with each engine includes one or more control stations, each having a control arm. The system includes one or more electronic control units, each of which is electro-mechanically coupled to an engine and transmission. A first electronic control unit (ECU) controls a throttle of a first engine and a shift position of a first transmission based on the electrical signal. The second ECU is coupled to the first ECU via the communications link, and controls the throttle of a second engine in the shift position of a second transmission based on a control signal from the first ECU.

In certain types of marine applications of communication buses, a reliable power supply at the helm of a marine vessel is extremely important, particularly if a drive-by-wire system is being used. In other words, if the throttle control handle is not mechanically connected to the actual throttle control of the marine propulsion system and the propulsion system relies on signals to transmit the desired handle position, a loss of power in the cable can be a very serious matter. In addition, without the provision of reliable electrical power, micro processors used on drive-by-wire systems could automatically reset, lock-up, or operate erratically. It is therefore important that these types of control systems be properly installed and maintained on the marine vessel. If a fault of any kind exists in the communication bus, it would be significantly helpful if this type of fault could be immediately monitored and detected to avoid improper operation of the drive-by-wire system as a result.

Many systems monitor battery voltage and provide a warning to the operator of a marine vessel if the battery is low or, for any reason, exhibits a battery voltage that is too high. However, it would be significantly beneficial if a system could be provided that detects other sorts of fault conditions such as bad connections at various junctions of the communication bus.

The patents described above are hereby expressly incorporated by reference in the description of the present invention.

SUMMARY OF THE INVENTION

A method of monitoring a communication bus, in accordance with the preferred embodiment of the present invention, comprises the steps of providing a source of electrical power, connected in electrical communication with the bus at a first location, measuring a first voltage potential at the first location of the bus, measuring a second voltage potential at a second location of the bus, and comparing the first and second voltage potentials. The present invention further comprises the step of determining an operating condition of the bus as a function of a differential between the first and second voltage potentials. The operating condition that is determined by the present invention is one of adequate operability or inadequate operability. By comparing the first and second voltage potentials, the present invention allows the condition of the bus to be monitored and a condition of operability or inoperability to be rapidly determined.

The first voltage potential can be measured by a first controller connected in signal communication with the first location of the bus. The second voltage potential can be measured by a second controller connected in electrical communication with the second location on the bus.

The present invention, described above, further comprises the step of communicating the first voltage potential from the first controller to the second controller prior to the comparing step described above. Alternatively, it could comprise the step of communicating the second voltage potential from the second controller to the first controller prior to the comparing step. The controllers comprise microprocessors. The source of electrical power, in a typical application, is an electrical storage battery.

In certain embodiments of the present invention, the second voltage potential can be measured by a first controller connected in electrical communication with a second location on the bus if a sensing wire is provided and connected between the first controller and the second location. In a typical application of the present invention, the communication bus comprises two power wires and at least one signal wire. In a common application of the CAN bus, two signal wires are provided. The communication bus can be a CAN bus and the communication bus can be a portion of a marine vessel communication system. The first location, in a particular embodiment of the present invention, is proximate a marine propulsion system and the second location is proximate a helm of the marine vessel.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
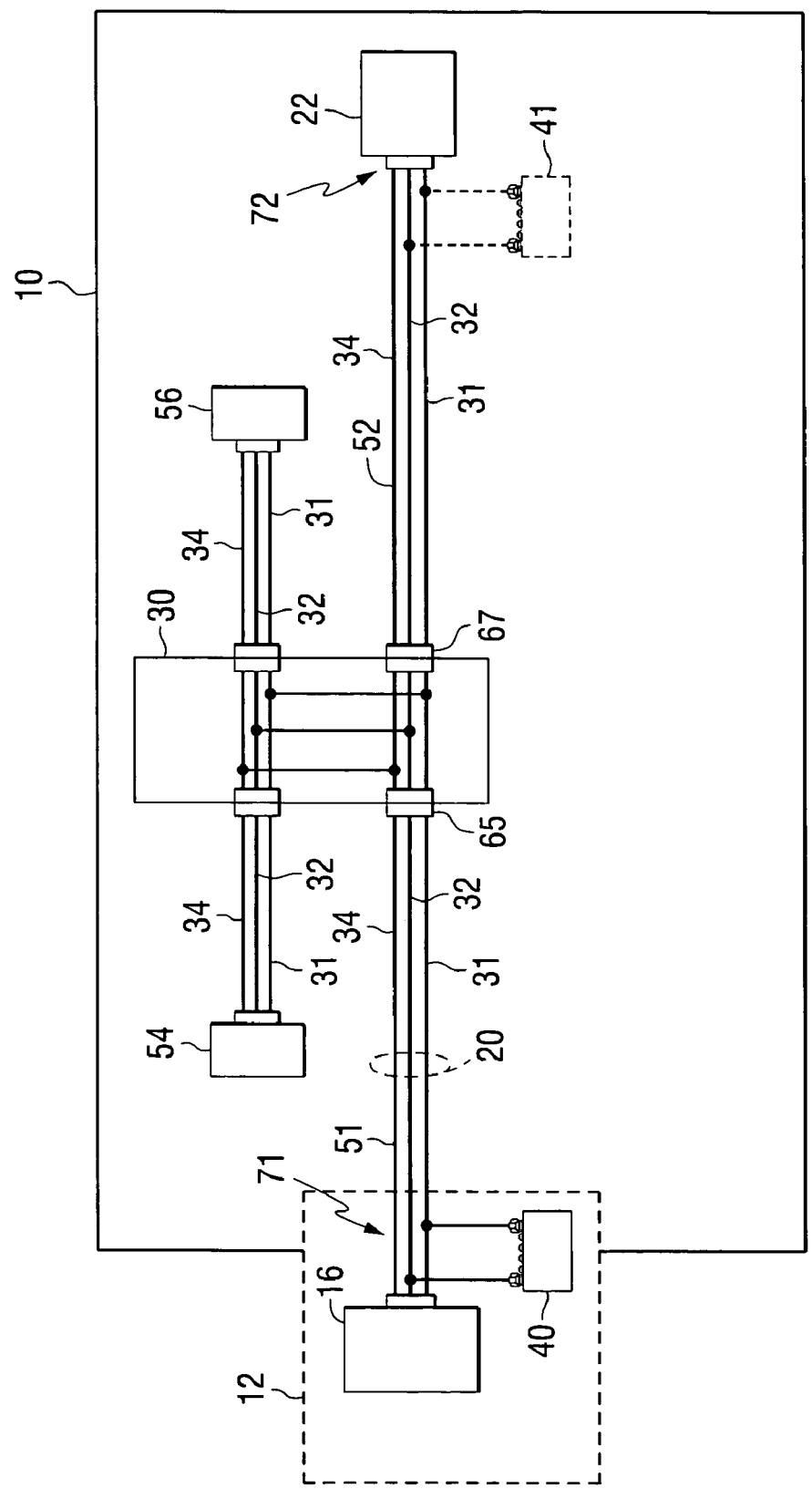
FIG. 1 is a simplified diagram showing the connections of various components to a communication bus that is being monitored by the present invention.

Throughout the description of the preferred embodiment of the present invention, like components will be identified by like reference numerals.

FIG. 1 is a schematic representation of a marine vessel 10 having a marine propulsion system 12 attached to it. The marine propulsion system 12 can be an outboard motor or a stern drive system. A propulsion control module (PCM) 16 is provided in association with an engine (not shown in FIG. 1) of the marine propulsion system 12. A multiple wire bus 20, such as a CAN bus, is used to connect various components of the marine vessel communication system. For example, a helm control module (HCM) 22 is located at the helm of the vessel 10 and the helm control module 22 is connected in signal communication with the PCM 16 of the marine propulsion system 12 by the CAN bus.

With continued reference to FIG. 1, a junction box 30 is provided to allow various modules connected to the bus 20 to be connected in signal communication with each other. In other words, the intended use of the bus 20 is to allow all the devices of marine vessel 10 to be interconnected to each other and then to communicate on a common pair of communication wires.

The simplified representation of the bus 20 provides two power wires, 31 and 32, and a communication wire 34. However, it should be understood that the communication wire 34, in most applications of the present invention, actually comprises a twisted pair of wires. A source of electrical power, such as the battery 40, is connected to the two power wires, 31 and 32, to provide electrical power to the system. For purposes of illustration, a first segment 51 and the CAN bus is connected between the PCM 16 and the junction box 30. A second segment 52 is connected between the junction box 30 and the HCM 22. Two other devices are shown connected to the junction box 30. These devices, which are identified by reference numerals 54 and 56, can be any sort of input or output device used in conjunction with the operation of the marine vessel 10. When a signal is provided on the CAN bus, the PCM 16, the HCM 22, and the devices, 54 and 56, can all receive the signal if the protocol determines that the signal is intended for their receipt.

Although the present invention will be described below in conjunction with certain faults that relate to loose connections between components on the communication bus, it should be understood that other types of faults can also be detected by the present invention. The change in voltage potential that is intended to be sensed by the present invention can represent an electric current that is higher than an acceptable magnitude. This can imply that an electrical short exists. A current that is higher than an acceptable magnitude can also represent the fact that too many devices are connected to the bus. Similarly, if one of the devices is drawing excessive current, the high current will result in a voltage potential that is different between the first and second locations on the bus. All of these potential faults can be detected by the present invention.

With continued reference to FIG. 1, it should be understood that the multiple connections illustrated in FIG. 1 each represent a potential loose connection or disconnection that could adversely affect the proper operation of the communication system. As an example, the connection 65 shown at the junction box 30, could become loose. This could create a high resistance connection that would deprive the helm control module 22 of the electrical power that it requires to operate properly. Since the throttle and shift mechanisms are typically located at the helm and connected to the helm control module 22, this could create a condition that is unsafe. Similarly, the connection point identified by reference number 67 could become loose and result in the same deleterious condition.

With continued reference to FIG. 1, the system can be described in more general terms without specific reference to which of the controllers is the propulsion control module 16 and which is the helm control module 22. The importance of the present invention is that it allows for the effective monitoring of the condition of the cable 20 regardless of which control module, 16 or 22, is located most closely to the source of power 40, which is a battery in a preferred embodiment. In more general terms, the present invention provides a source of electrical power 40 connected in electrical communication with the bus 20 at a first location 71. A first voltage potential is measured at the first location 71 of the bus 20. A second voltage potential is measured at a second location 72 of the bus 20. The first and second voltage potentials are compared to each other. In an ideal situation, these two voltage potentials will be essentially identical to each other because it is not expected that the communication bus 20 will have a significant voltage drop between the first location 71 and the second location 72. However, it should be understood that a bad connection at either connector 65 or 67 could provide such a voltage drop that would have a deleterious effect on the operation of the controller, either 16 or 22, that is farthest from the battery 40.

With continued reference to FIG. 1, the first voltage potential is measured by a first controller 16 connected in electrical communication with the first location 71 on the bus 20. The second voltage potential is measured by a second controller 22 connected in electrical communication with the second location 72 on the bus 20. Depending on which alternative embodiment of the present invention is used, the first or second voltage potential is then communicated to a primary one of the two controllers, 16 and 22, so that it then knows that magnitudes of both voltage potentials. As an example, the next step of the subject invention could be the communication of the first voltage potential from the first controller 16 to the second controller 22 prior to the comparing step where the first and second voltage potentials are compared. Alternatively, that step could comprise the step of communicating the second voltage potential from the second controller 22 to the first controller 16 prior to the comparing step. The important aspect of this element of the present invention is that the voltage potentials at the first and second locations, 71 and 72, are both known to a common controller so that the comparing step can be completed satisfactorily.

Although not illustrated for purposes of clarity and simplicity in FIG. 1, it should be clearly understood that an additional sensing wire can be connected between the second location 72 and the first controller 16 or, vice versa, the sensing wire can be connected between the first location 71 and the second controller 22. This presents an alternative way for one of the controllers to be selected to read both voltage potentials at the first and second locations, 71 and 72. As an example, if the sensing wire is extended from the second location 72 to the first controller 16, the first controller would read the first voltage potential at the first location 71 because it is connected directly to it. It would read the second voltage potential at the second location 72 through the sensing wire which would be presumed to be sufficiently continuous to provide an accurate and reliable reading of the second voltage potential at the second location 72. This system would not require the first and second controllers, 16 and 22, to communicate directly with each other on the bus 20 by using the communication line 34 of the bus.

With continued reference to FIG. 1, an alternative location of the power source 41 is represented by dashed lines. As can be seen, the dashed line version of the power source 41 is much closer to the second location 72 than the first location 71. The present invention can operate equally satisfactorily in either situation. The basic premise of the present invention is that a voltage potential is read at the first location 71 and the second location 72 so that these first and second voltage potentials can be compared to each other to assure that no significant conditions exist in the cable 20 that could result in voltage drops. These would normally be caused by loose or faulty conditions which exhibit a high resistive situation that, in turn, result in insufficient voltage at an extreme end of the cable 20.

Figure 2:
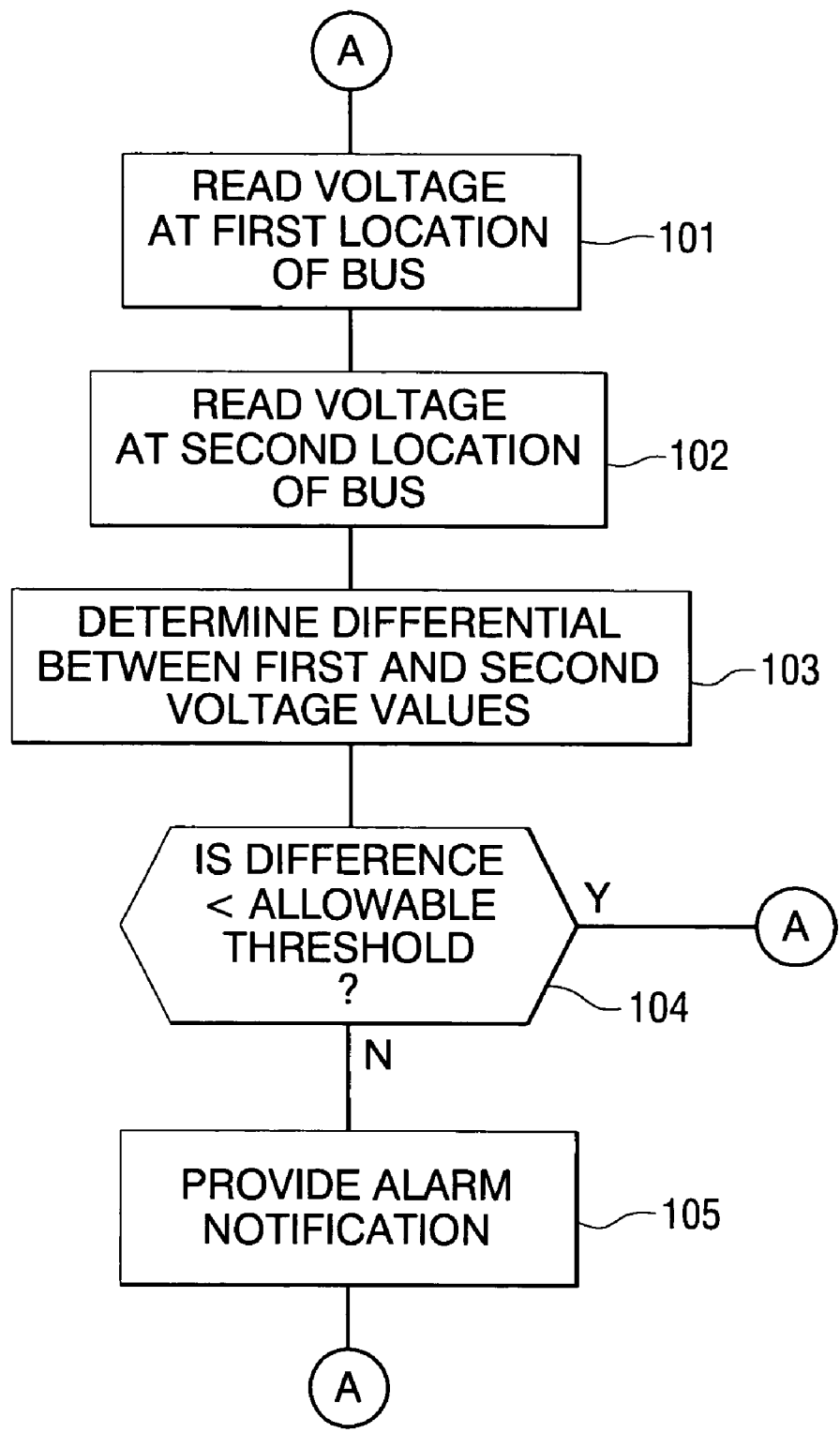
FIG. 2 is a simplified flowchart showing the basic steps of the present invention.

FIG. 2 is a simplified flow chart showing the basic steps of the present invention. At functional block 101, the first voltage potential is read at the first location 71. This is typically done by the first controller 16. At functional block 102, the second voltage potential is read at the second location 72 of the bus 20. Typically, this is done by the second controller 22. At this point, the first voltage potential is known to the first controller 16 and the second voltage potential is known to the second controller 22. Prior to performing functional block 103, the information is communicated between the first and second controllers, 16 and 22, so that one controller knows both of these items of information. The second controller 22 can communicate its information regarding the second voltage potential to the first controller 16 or, vice versa, the first controller 16 can communicate its information to the second controller 22. Regardless of the alternative methods of communicating this information, when a single controller, 16 or 22, knows the magnitudes of both the first and second voltage potentials, the differential between the first and second voltage potentials can be determined as represented in functional block 103. If the difference between these voltage potentials is relatively small, a satisfactory condition of the cable 20 is determined. This means that no faulty connections, such as at points 65 or 67, exist. It also means that satisfactory voltage is available at the controller which is farthest from the power source 40. In this event, determined at functional block 104, the system returns to point A to again monitor the first and second voltage potentials. If the difference between the two voltage potentials exceeds an allowable threshold, an alarm is provided at functional block 105 and the operator of the vessel is alerted to the fact that the voltage potential at a point remote from the power source 40 is insufficient to satisfactorily perform the tasks of that related controller.

Although the present invention has been described in particular detail and illustrated to show a preferred embodiment, it should be understood that alternative embodiments are also within its scope.

I claim:
1. A method of monitoring a communication bus, comprising the steps of:
provided a source of electrical power connected in electrical communication with said bus at a first location;
measuring a first voltage potential at said first location of said bus;
measuring a second voltage potential at a second location of said bus;
comparing said first and second voltage potentials; and determining an operation condition of said bus as a function of a differential between said first and second voltage potentials.

2. The method of claim 1, wherein:
said first voltage potential is measured by a first controller connected in electrical communication with said first location on said bus.

3. The method of claim 2, wherein:
said second voltage potential is measured by a second controller connected in electrical communication with said second location on said bus.

4. The method of claim 3, further comprising:
communicating said first voltage potential from said first controller to said second controller prior to said comparing step.

5. The method of claim 3, further comprising:
communicating said second voltage potential from said second controller to said first controller prior to said comparing step.

6. The method of claim 1, further comprising:
providing a battery as said source of electrical power; and connecting said battery to said bus at said first location.

7. The method of claim 1, wherein:
said second voltage potential is measured by a first controller connected in electrical communication with said second location on said bus.

8. The method of claim 7, further comprising:
providing a sensing wire connected between said first controller and said second location.

9. The method of claim 1, wherein:
said communication bus comprises two power wires and at least one signal wire.

10. The method of claim 1, wherein:
said communication bus is a CAN bus.

11. The method of claim 1, wherein:
said communication bus is a portion of a marine vessel communication system.

12. The method of claim 1, wherein:
said first location is proximate a marine propulsion system.

13. The method of claim 1, wherein:
said second location is proximate a helm of a marine vessel.

14. A method of monitoring a communication bus, comprising the steps of:
providing a source of electrical power connected in electrical communication with said bus at a first location, said communication bus being a CAN bus, said communication bus being a portion of a marine vessel communication system;
measuring a first voltage potential at said first location of said bus;
measuring a second voltage potential at a second location of said bus;
comparing said first and second voltage potentials;
determining an operation condition of said bus as a function of a differential between said first and second voltage potentials.

15. The method of claim 14, wherein:
said first voltage potential is measured by a first controller connected in electrical communication with said first location on said bus; and
said second voltage potential is measured by a second controller connected in electrical communication with said second location on said bus.

16. The method of claim 15, further comprising:
communicating said first voltage potential from said first controller to said second controller prior to said comparing step.

17. The method of claim 15, further comprising:
communicating said second voltage potential from said second controller to said first controller prior to said comparing step.

18. The method of claim 14, wherein:
said second voltage potential is measured by a first controller connected in electrical communication with said second location on said bus.

19. The method of claim 18, wherein:
said first location is proximate a marine propulsion system and said second location is proximate a helm of a marine vessel.

20. A method of monitoring a communication bus, comprising the steps of:
providing a source of electrical power connected in electrical communication with said bus at a first location, said communication bus being a CAN bus, said communication bus being a portion of a marine vessel communication system;
measuring a first voltage potential at said first location of said bus;
measuring a second voltage potential at a second location of said bus;
comparing said first and second voltage potentials;
determining an operation condition of said bus as a function of a differential between said first and second voltage potentials, said first voltage potential being measured by a first controller connected in electrical communication with said first location on said bus, said second voltage potential being measured by a second controller connected in electrical communication with said second location on said bus; and
communicating said first voltage potential from said first controller to said second controller prior to said comparing step, said first location being proximate a marine propulsion system and said second location being proximate a helm of a marine vessel.

* * * * *